UNITED STATES PATENT OFFICE.

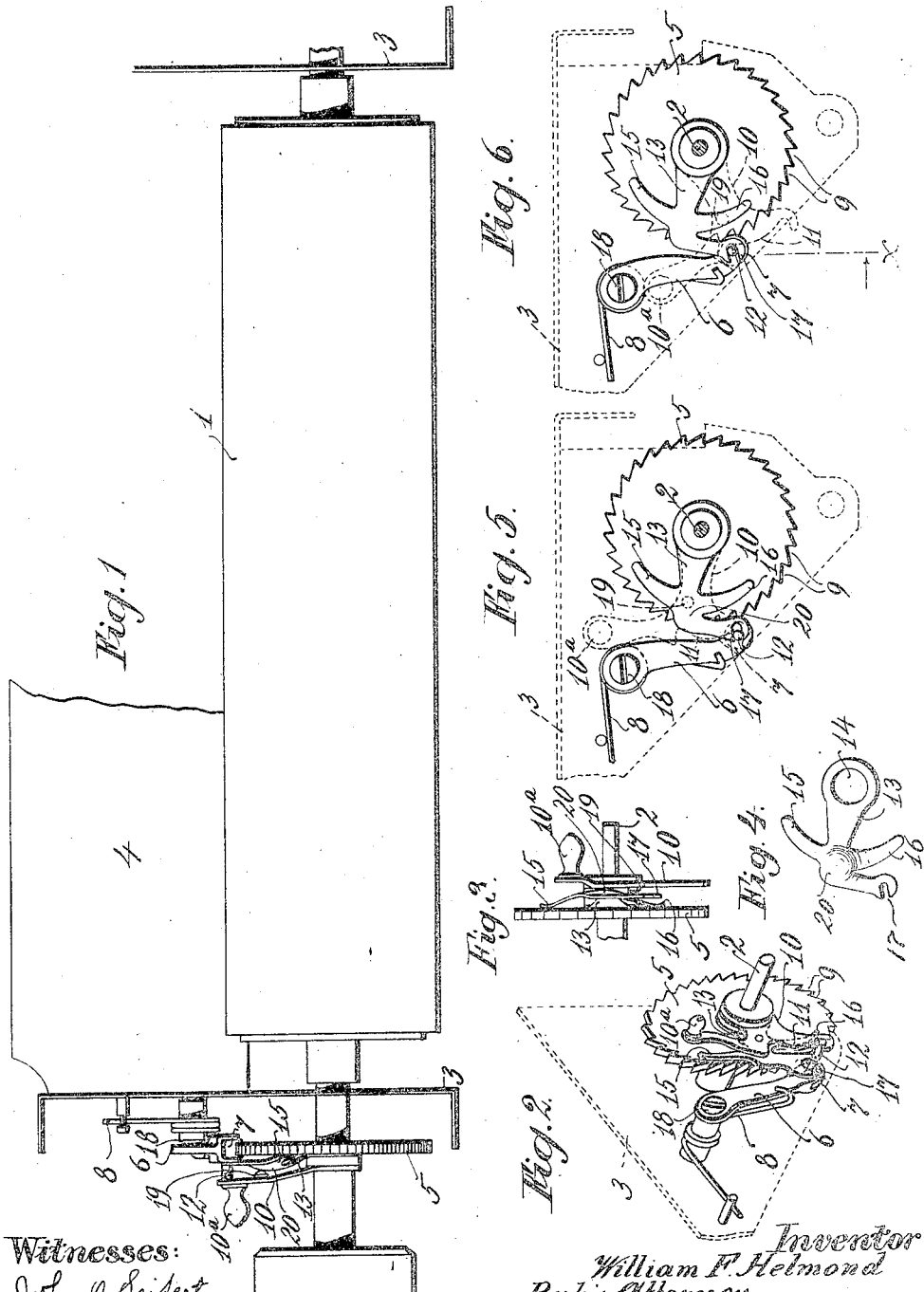

WILLIAM F. HELMOND, OF HARTFORD, CONNECTICUT, ASSIGNOR TO UNDERWOOD TYPE-WRITER COMPANY, OF NEW YORK, N. Y., A CORPORATION OF NEW JERSEY.

TYPE-WRITING MACHINE.

No. 875,262.      Specification of Letters Patent.      Patented Dec. 31, 1907.

Application filed October 12, 1907. Serial No. 397,039.

*To all whom it may concern:*

Be it known that I, WILLIAM F. HELMOND, a citizen of the United States, residing in Hartford, in the county of Hartford and State of Connecticut, have invented certain new and useful Improvements in Type-Writing Machines, of which the following is a specification.

This invention relates to the revoluble platens of typewriting machines, such as are usually provided with notched line space wheels and spring detents to engage the notches to hold the platen steady during the writing.

The object of my invention is to provide simple and inexpensive means which may be readily applied to existing machines for releasing the line space wheel from the control of said detent, and applying a brake to the line space wheel in lieu of the said detent.

In carrying out my invention, I provide an arm struck up from sheet metal, and readily placed upon the axle of the platen, and adapted to bear sidewise against the face of the line space wheel to serve as a brake for the latter; and I also provide means upon the usual detent releasing lever for holding said brake out of use when the detent is in use; the movement of the lever to release the detent, being also made to force the brake to act upon the line space wheel.

In the accompanying drawings, Figure 1 is a plan of a platen and platen frame of the well known front strike Underwood typewriting machine, showing my improvements applied thereto. Fig. 2 is a perspective of the line space wheel and appurtenances, the line space wheel being shown as released from the detent. Fig. 3 is a sectional view taken at about the line X of Fig. 6, and showing the parts in normal positions. Fig. 4 is a view of the brake. Fig. 5 is a side view of the parts seen at Fig. 2, showing the detent released and the brake in action. Fig. 6 is a view similar to Fig. 5, but showing the detent in working position, and the brake released.

The usual platen 1 is mounted by means of an axle 2 in the ends 3 of a platen frame, which also comprises a paper shelf 4. Upon the axle is fixed a line space wheel 5, which is operated by the usual line space lever and pawl, not shown.

A detent arm 6 carries a roll 7, which is forced by a spring 8 into the notches 9 of said line space wheel, in the usual manner.

A lever 10 is mounted to turn about the axle 2, and carries a finger piece 10ª, whereby it may be turned from the Fig. 6 or normal position to the Fig. 5 position, during which movement, a cam edge 11 formed on said lever, engages the projecting axle 12 of said roll 7 to force the roll away from the wheel, so that the platen may be set to any desired point for writing on ruled lines, irregular line-spacing, etc.

As so far described in detail, the mechanism is in common use in said Underwood typewriting machine.

I form from sheet metal an arm 13, having a perforation or bearing 14 to fit upon the platen axle, or a collar thereon; and extending upwardly and downwardly from said arm are fingers 15 and 16, the tips of which are intended to bear against the outer face or side of the line space wheel 5, to prevent accidental movement of the latter when the detent 6 is released. Said arm is prevented from rotating about the axle 2 by means of a forked or slotted end 17, which engages said projecting axle 12, such slot being cut substantially concentric with the axis 18 of the detent 6. Upon the said release arm 10, I fix a projecting pin 19 which is normally idle, but which, during the upward movement of the lever, from the Fig. 6 to the Fig. 5 position, rides up along an inclined portion 20 of the arm 10, (formed by bending or stamping the latter inwardly) to force the tips of the fingers 15 and 16 against the side of the line space wheel. Thus, the line space wheel is under the control of the brake when released from the detent 6, so that accidental rotation of the platen is avoided.

By depressing the lever 10 again to the Fig. 6 position, the parts are restored to normal positions, and the line space wheel rotates independently of the brake.

Having thus described my invention, I claim:

1. In a typewriting machine, the combination with a platen having an axle and a frame in which the axle is journaled, of a line space wheel upon said axle, a spring detent having a roll, a lever mounted to turn upon said axle and having a finger piece, and also having means to throw said detent away from said wheel, a brake arm mounted upon said axle by the side of said lever to bear upon the face of said wheel, and having a slot in engagement with the axle of said detent roll, to prevent the arm from turning, said arm having a cam portion, and said lever having a normally idle part, which at the releasing movement of the lever engages said cam portion to force the brake to act upon the wheel.

2. In a typewriting machine, the combination of a platen, a line space-wheel, a detent, a detent spring, a lever having a finger-piece, and also having means to force and hold said detent away from the wheel against the pressure of said spring, an arm, and a finger extending from said arm for bearing upon the face of said wheel to oppose the movement of the latter and of the platen, said arm having a cam portion, and said lever having a normally idle device which at the detent-releasing movement of the lever engages said cam portion to transmit force from the lever to the brake to force the latter against the wheel independently of the detent spring.

3. In a typewriting machine, the combination with a platen having an axle and a frame in which the axle is journaled, of a line-space wheel upon said axle, a spring detent having a roll, a lever mounted to turn about said axle and having a finger piece, and also having means to throw said detent away from said wheel, and an arm mounted upon said axle by the side of said lever and having a slot in engagement with the pin of said detent roll, to prevent the arm from turning, fingers extending from said arm to bear upon the face of said wheel to oppose the movement of the latter and of the platen, said arm having a cam portion bent or stamped therein, and said lever having a normally idle projection which at the releasing movement of the lever engages said cam portion to force the brake fingers to bear against the wheel.

WILLIAM F. HELMOND.

Witnesses:
W. M. DYORKMAN,
MORTON C. TALCOTT.